(12) United States Patent
Hung et al.

(10) Patent No.: US 7,162,071 B2
(45) Date of Patent: Jan. 9, 2007

(54) PROGRESSIVE SELF-LEARNING DEFECT REVIEW AND CLASSIFICATION METHOD

(75) Inventors: Chang-Cheng Hung, Jubei (TW);
Tyng-Hao Hsu, Hsinchu (TW);
Chin-Hsiang Lin, Hsinchu (TW);
Chuan-Yuan Lin, Taichung (TW);
Shin-Ying Chen, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 722 days.

(21) Appl. No.: 10/326,499

(22) Filed: Dec. 20, 2002

(65) Prior Publication Data

US 2004/0120569 A1    Jun. 24, 2004

(51) Int. Cl.
*G06K 9/00*    (2006.01)

(52) U.S. Cl. .......................................................... 382/144

(58) Field of Classification Search ................. 382/144
See application file for complete search history.

(56) References Cited

U.S. PATENT DOCUMENTS 4,736,437 A * 4/1988 Sacks et al. ................. 382/216
6,292,582 B1 * 9/2001 Lin et al. ..................... 382/149

* cited by examiner

*Primary Examiner*—Joseph Mancuso
*Assistant Examiner*—Jonathan Schaffer
(74) *Attorney, Agent, or Firm*—Tung & Associates

(57) ABSTRACT

A progressive self-learning (PSL) method is provided for enhancing wafer or mask defect inspection review and classification by identifying a plurality of wafer or mask defects, and by classifying each of the plurality of defects according to an extent of resemblance of each defect. The method having the steps of: performing image processing on a scanned defect image; aligning the scanned defect image with a just-stored digitized defect image; matching the scanned defect image with a just-stored digitized defect image; and classifying the scanned defect image.

16 Claims, 4 Drawing Sheets

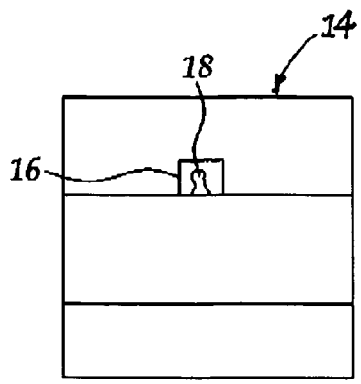
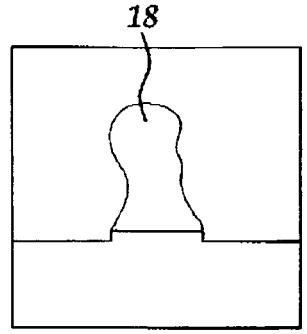
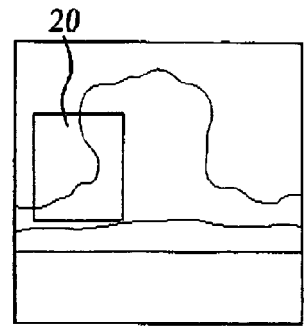
*Figure 1A*  *Figure 1B*  *Figure 1C*
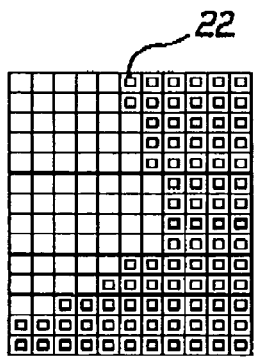
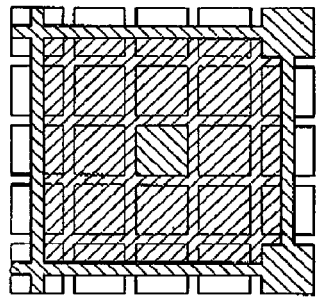
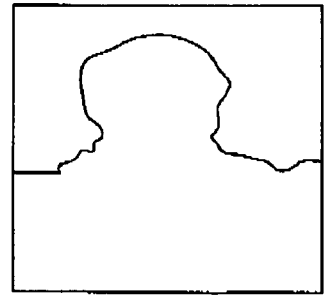
*Figure 2A*  *Figure 2B*  *Figure 2C*
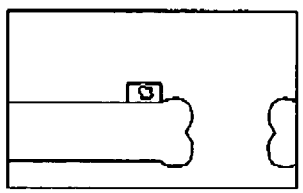
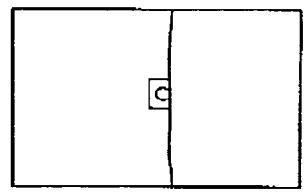
*Figure 3A*  *Figure 3B*
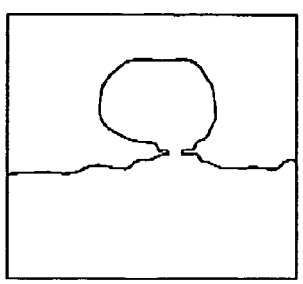
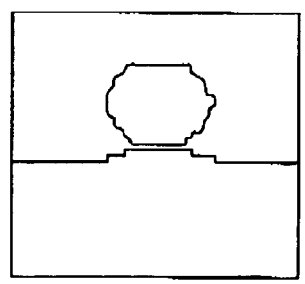
*Figure 3C*  *Figure 3D*

PROGRESSIVE SELF-LEARNING DEFECT REVIEW AND CLASSIFICATION METHOD

FIELD OF THE INVENTION

The present invention is directed to a progressive self-learning wafer defect review and classification method for enhancing a defect inspection process in a wafer fabrication facility.

BACKGROUND

An existing method for reviewing and classifying wafer/mask defects is a mandatory manual task using existing hardware configurations in current wafer manufacturing environments. The need for advanced mask-making and wafer fabrication capability grows as the demand for semiconductor technology having small features increases. Optical proximity correction (OPC) is becoming a standard procedure for printing deep subwavelength features in current wafer/mask manufacturing. Data preparation and data handling require file size expansion using OPC corrected layouts. Aggressive OPC correction lengthens a conversion time for fracturing and prolongs a mask writing time. Existing OPC corrected layout systems and methods challenge wafer/mask inspection capability. In addition, a lack of hardware development in mask inspection has turned mask inspection into a bottleneck in the wafer fabrication process. Thus, a full automation inspection method is infeasible using existing mask inspection tools.

Wafer/mask defect inspection, particularly, wafer/mask defect review and classification, is time consuming, tedious work requiring an operator's manual assistance. A mask inspection requires an operator or an engineer to review each captured defect one by one and to classify each defect according to a pre-defined printability rule or defect number which indicates a severity of a defect. Each defect type is stored in a pre-stored, fixed defect library according to a pre-defined printability rule. For cases having a defect number less than 100, defect classification is not a problem and should not impact mask-making cycle time. However, as a defect number increases above 100, defect classification becomes time-consuming, thus, prolonging the mask-making cycle time.

For cases with a relatively small number of captured defects, defect classification itself does not put too much burden to operators or engineers. With a moderate increase of defects, it would, however become a time-consuming process and prolong the total wafer defect inspection and mask-making cycle time. Should too many nuisance defects be caught under a given detection sensitivity, engineers would generally loosen detection sensitivity in order to reduce the number of nuisance defects. By doing that, however, there exists potential threat of neglecting real defects.

If too many nuisance defects are caught using a pre-defined detection sensitivity, an engineer will generally loosen detection sensitivity to reduce the number of captured nuisance defects. Using the existing system can fail to detect real defects.

In existing systems, detectors are intentionally turned off to avoid encountering nuisance defects when using certain detector settings, however, intentionally turning off specific detector settings may result in missing of serious real defects.

The current workflow of mask defect inspection or wafer defect inspection is labor intensive. Bottlenecks resulting from time consuming defect classification during wafer/mask fabrication can prolong cycle times of integrated circuit or wafer/mask fabrication.

The current flow of wafer/mask inspection has two major steps, inspection and review. The steps may be performed by first inspecting defects and then reviewing defects, however, optionally, the two steps may be performed simultaneously. An existing defect inspection step requires an operator or an engineer to identify or review and then classify each defect one at a time.

The present invention provides a progressive self-learning (PSL) defect classification method to relieve operator or engineer loading and to accelerate the wafer/mask fabrication by shortening the time needed for a wafer or mask defect review process.

The PSL method of the present invention can reduce an operator's loading time and can accelerate a wafer or mask defect classification process by offering flexibility to progressively build a defect image database of wafer or mask defect classification during each run of the PSL method instead of using a pre-stored, fixed defect library. The PSL method of the present invention uses shape extraction and size determination of mask or wafer defects to fully automate a mask or wafer defect classification process.

SUMMARY OF THE INVENTION

The present invention provides a progressive self-learning (PSL) method for defect inspection to relieve loading from operators or engineers and further accelerate defect review and classification process. The PSL method of the present invention uses the steps of image extraction, digitization, alignment, matching, and classification. The PSL method does not use any pre-stored defect library at the beginning of a particular inspection run. Thus, a just-stored defect image database is progressively built during the initial stage of defect review and classification during each inspection run. The present invention provides flexibility over the existing manual detection systems and eliminates limitations of existing systems. The present invention stores all defect images suitable for network transfer in the just-stored defect image database. Preferably, the C language is adopted to implement the method of the present invention to avoid porting problems and to prevent limitation to a particular tool. The PSL method provides a more efficient and accurate means of detection and of classification than existing manual methods.

The PSL method used by the present invention is a derived application of a pattern recognition system or a computer vision system. The application may use current wafer/mask inspection hardware to provide scanned images of captured wafer or mask defects. The scanned images are then ready for a post-image processing in accordance with the present invention. The present classification method does not use the pre-stored and fixed defect library as required in existing manual classification methods, thus, the present classification method offers a flexible design. Additionally, the present classification method eliminates the need for light calibration and for pixel conversion.

The PSL method performs five basic steps to enhance the efficiency and accuracy of the defect review and defect classification process, preferably, the five basic steps include the steps of image extraction, digitization, alignment, matching, and classification.

The image extraction step is the first step used in a post-scanned image process flow. The image extraction step identifies a plurality of photomask or wafer defects, and classifies each of the plurality of defects according to an extent of resemblance of each defect. In the image extraction step, a relatively small defect region or field of vision having a dimension of n pixels by n pixels is extracted from a scanned image, wherein n is a pre-defined and programmable number. A relative small field of vision avoids vicinal pattern dependence as is described further below.

The next step of image processing in accordance with the present invention is the step of digitization of the extracted image. The digitization step renders a position-intensity matrix or 2-bit defect image map, preferably using a square tessellation method using raster-graphics for representing the extracted image. During the digitization step, any image messaging method may be used to message the extracted image, preferably, a well-known messaging method such as smoothing, enhancing, and filtering.

Once a defect image has been extracted and digitized, an alignment step and matching step is performed to automatically classify each type of wafer or mask defect. Both aligning and matching two defect images can be achieved by using a tessellated matching step, wherein the tessellated matching step further uses one of a two-dimensional translation step and a rotational movement step. The criteria used in the step of aligning and matching includes position, intensity, and size.

The alignment step is performed by comparing a target defect with a just-stored defect image database, wherein the just-stored defect image database is formed using the PSL method of the present invention.

Image segmentation technology is preferably used to assist in the alignment step and the matching step. Once a shape of a defect is determined, the dimensions of the defect can be determined by counting the number of tessellated squares disposed within the defect. Two basic shapes are used in the alignment step to detect a wafer or a mask defect, wherein the defect preferably has a bulky square region, and a round region. The bulky square region is used in the alignment step to align a first defect with a second defect, but is ignored during the matching step. No bulky region is found for defects such as isolated dots and holes. The bulky square pattern serves as a pre-step to differentiate between isolated defects and near-pattern defects.

The round region is used as a reference in the alignment step to locate a defect position. The round shape does not have a fixed diameter, but rather, is determined using several iterations of the alignment step in accordance with an alignment formula or the present invention. A round shape is particularly useful for defining defects such as a bump-on-pattern defect and a dent-on-pattern defect.

The classification step is preferably selected from a manual classification step and a self acting classification step. The manual classification step is performed when a just-stored defect image database is empty. The self-acting classification step is performed by comparing a target defect image with a just-stored digitized defect image disposed within a just-stored defect image database. Preferably, the just-stored defect image database is formed by performing several iterations of steps within the PSL method in accordance with the present invention.

Successful implementation of the PSL method to classify mask or wafer defects will reduce an operator's loading time and accelerate the timing of the classification process. Also, the PSL method will automatically classify same type of defects without the need for additional human intervention. The PSL method is particularly beneficial for use in a stage of wafer/mask process developing, wherein repetitious types of defects are frequently observed. The PSL method also provides a step for automatically categorizing nuisance defects.

BRIEF DESCRIPTION OF THE DRAWINGS

These and other objects, features and advantages of the present invention will become apparent from the following detailed description and the appended drawings in which:

FIG. 1a illustrates an original defect image saved from a mask inspection tool.

FIG. 1b illustrates an extracted image extracted from the original defect image as shown in FIG. 1a.

FIG. 1c illustrates a 2-bit image map of the extracted image as shown in FIG. 1b.

FIG. 2a illustrates a portion of the 2-bit image map as shown in FIG. 1c that has been manipulated using a square tessellation method in accordance with the present invention.

FIG. 2b illustrates a square tessellation superimposed onto the 2-bit image map as shown in FIG. 2a.

FIG. 2c illustrates a transformation of the 2-bit defect map shown in FIGS. 1a–c into a segmented image.

FIG. 3a illustrates an original defect image of the bump-on-pattern type.

FIG. 3b illustrates an original defect image of the bump-on-pattern type.

FIG. 3c illustrates an enlarged view of the original defect image from FIG. 3a, wherein the image has been modified using a PSL method in accordance with the present invention.

FIG. 3d illustrates an enlarged view of the original defect image from FIG. 3b, wherein the image has been modified using a PSL method in accordance with the present invention.

DETAILED DESCRIPTION OF THE PREFERRED EMBODIMENT

Figure 4:
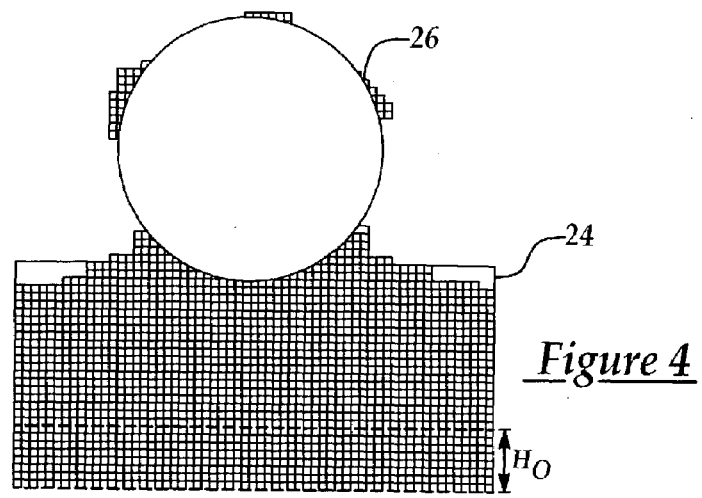
FIG. 4 is an illustration of an image segmentation step in accordance with the present invention.

The present invention provides a progressive self-learning (PSL) method for enhancing wafer or mask defect review and classification by identifying a plurality of photomask or wafer defects, and classifying each of the plurality of defects according to an extent of resemblance of each defect.

Successful implementation of the PSL method to classify mask or wafer defects will reduce an operator's loading time and accelerate the timing of the classification process. Also, the PSL method will automatically classify same type of defects without the need for additional human intervention. The PSL method is particularly beneficial for use in a stage of wafer or mask process developing, wherein repetitious types of defects are frequently observed. The PSL method also provides a step for automatically categorizing nuisance defects.

The PSL method of the present invention performs five basic steps to enhance the efficiency and accuracy of a wafer or mask defect review and defect classification process, preferably, the five basic steps include the steps of image extraction, digitization, alignment, matching, and classification.

More particularly, in a preferred embodiment of the present invention, the PSL method provides the steps of:

performing image processing on a scanned defect image retrieved from a scanned defect image file;

aligning the scanned defect image with a just-stored digitized defect image;

matching the scanned defect image with a just-stored digitized defect image; and classifying the scanned defect image according to a classification method selected from the group of self-acting and manual.

The step of performing image processing on a scanned defect image retrieved from a scanned defect image file preferably provides the steps of:

extracting a scanned defect image from a scanned defect image file; and digitizing the scanned defect image using pre-selected digitizing parameters.

The step of extracting a scanned defect image from a scanned defect image file is the first step used in a post-scanned image process flow. In the image extraction step, a relatively small defect region or field of vision having a dimension of n pixels by n pixels is extracted from a scanned image, wherein n is a pre-defined and a programmable number. A relative small field of vision avoids vicinal pattern dependence as is described further below.

Referring now to the figures, FIGS. 1a–c illustrate a scanned extracted and digitized mask defect image, preferably, the scanned wafer defect image is a mask defect image. More particularly, FIG. 1a illustrates a defect image 14 which was scanned from a KLA 365 reticle inspection system for further image processing. The type of defect as shown in FIG. 1a is a bump-on-pattern defect. The square box 16, shown in FIG. 1a, illustrates a desired extraction region 18 of the bump-on-pattern defect scanned image 14. FIG. 1b illustrates an enlarged 16-bit gray scale view of the extracted region 18 as shown in FIG. 1a.

FIGS. 1a–c, and 2a–c illustrate a small region of the scanned defect image extracted from the original scanned defect image and centered at the defect site. By extracting the small region 18 of the defect image, neighboring pattern or vicinal dependence that occurs during defect classification automation is avoided.

The next step of image processing in accordance with the present invention is the step of digitizing the scanned defect image 14 using pre-selected digitizing parameters. During the digitization step, any image messaging method may be used to massage the extracted defect image, preferably, a well-known messaging method such as smoothing, enhancing, and filtering.

The digitization step provides the additional steps of converting the extracted region 18 into a 2-bit defect map, and then transforming the 2-bit defect map into a segmented image.

The step of converting the extracted region 18 into a 2-bit image map preferably uses a square tessellation step or method to provide a position-intensity matrix or 2-bit defect map for representing the extracted scanned defect image. The digitized extracted region is rendered by a position-intensity matrix map, the map being co-fed into images aligned with pre-stored, digitized, and classified defect matrix map. Additionally, images may be extracted and digitized using a vertical reference line and then may be rotated 90° to prepare the extracted digitized images for the alignment step.

In a preferred embodiment, FIG. 1c, illustrates the step of converting the extracted region as shown in FIG. 1b into a 2-bit defect map 20. Once the boundary of the defect has been identified, the content of individual intensity is no longer needed. Thus, manipulation and comparison of 2-bit image maps is made easy and efficient.

FIG. 2a illustrates a portion of FIG. 1c wherein the 2-bit image map 20 is formed preferably using a square tessellation method. FIG. 2b illustrates an enlarged view of a tessellated square 22, as shown in FIG. 2a, wherein each tessellated square has 9 bits disposed therewithin and shares 16 circumvented bits with each adjacent tessellated square. Thus, as shown in FIG. 2b, each tessellated square from FIG. 2a is generated from 25 bits, wherein at least one of the 25 bits is labeled black. A plurality of tessellated squares from FIG. 2a are outlined with bold connected lines, the plurality of tessellated outlined squares form a sub-region of tessellation. The sub-region of tessellation corresponds to the original scanned defect image shape as shown in FIG. 1a.

The step of transforming the 2-bit defect map 20 into a segmented image is shown in FIG. 2c. FIG. 2c illustrates a transformation of the 2-bit defect map 20 as shown in FIGS. 1a–c into a segmented image. The 2-bit defect map transformation step expresses a sub-region of tessellation as a simple polygon or a plurality of polygons, wherein the plurality of polygons form a set. The transformation of the sub-region of tessellation, 2-D pixel matrix or 2-bit defect map into a simple polygon, or sets of polygons provides a description of any given defect shape or map using a limited number of coordinates representing a plurality of polygon vertexes. The method of polygon representation or image segmentation provides for storage efficiency and fast computation speed. FIG. 2c illustrates a polygon representation of the scanned defect image 14.

A preferred embodiment as shown in FIGS. 3a–d illustrates the advantage of extracting a small region; more particularly, FIGS. 3a–b illustrate two bump-on-pattern defect images. FIG. 3a illustrates a defect image showing a bump-on-pattern image extracted and digitized along a horizontal line. FIG. 3c shows an enlarged view of the extracted and digitized image of FIG. 3a. FIG. 3b illustrates a defect image showing an alternative bump-on-pattern image extracted and digitized along a vertical line. FIG. 3d shows an enlarged view of the extracted and digitized image of FIG. 3b. Without using the PSL method of the present invention, enlarged views of 3a and 3b seem dissimilar. However, after the PSL method of the present invention is applied to image 3a, and image 3b, respectively, images 3c and 3d show a high degree of resemblance. As shown above, using the PSL method of the present invention, vicinal dependence is avoided, and a shorter run time is provided by using the small extracted defect region.

Once a segmented shape of a scanned defect image is determined, the dimensions of the defect can be determined by counting the number of tessellated squares disposed within the defect and further segmenting the scanned defect image into two basic shapes, preferably, a bulky square region, and a round region. The elementary shapes are used in the alignment and matching step to detect and classify a wafer or a mask defect.

Preferably, the bulky square region is used in the alignment step as a reference to align the scanned defect image with a just-stored defect image, but is ignored during the matching step. No bulky region is found for defects such as isolated dots and holes. The bulky square pattern serves as a pre-step to differentiate between isolated defects and near-pattern defects.

The round region is used as a reference in the alignment step to locate a defect position. The round shape does not have a fixed diameter, but rather, is determined using several iterations of an alignment mapping formula during the alignment step in accordance with the present invention. A round shape is particularly useful for defining defects such as a bump-on-pattern defect and a dent-on-pattern defect.

Determination of a satisfactory alignment is made by programming a pre-defined tolerance. The image alignment process operates to pre-screen a match, wherein if the just-stored defect image fails in this process, the image alignment will not proceed to the matching step. Both aligning and matching of two defect images can be achieved using one of a two-dimensional translation step and a rotational movement step.

The criteria used in both aligning step and the matching step includes position, intensity, and size.

FIG. 4 is an illustration of a segmented image using an alignment process in accordance with the present invention. The polygonal image of FIG. 2c is enlarged and segmented into elemental shapes, a rectangle 24, and a circle 26. An original size of the rectangle is represented by a dashed line, wherein original height of the rectangle is $H_o$; and original size of the circle is represented by the dashed line, wherein the diameter of the circle is $D_o$. A final dimension of the rectangle 24 and circle 26, is shown by an associated outer solid line, respectively.

As shown in FIG. 4, a height H of the rectangle 24 has an original height $H_o$, and a diameter D of the rectangle 26 has an original diameter $D_o$, wherein H and D are varied during each iteration of the alignment step. A final result of the alignment step shown in FIG. 5, wherein FIG. 5 illustrates two segmented mapped or aligned images as a solid rectangle 28 and a solid circle 30.

Figure 5:
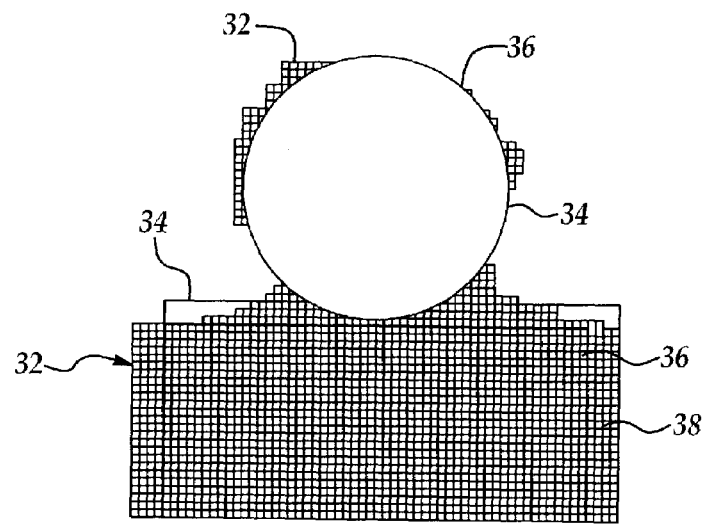
FIG. 5 illustrates two aligned images as a solid rectangle and a solid circle.

FIG. 5 illustrates an example of the aligning step for two defect images, FIG. 5 further showing an overlapping view of two defect images. Dashed and solid lines indicate final results of aligning a first and a second image, respectively, wherein the dashed line 32 indicates an extracted shape of the first image and wherein the solid line 34 indicates an extracted shape of the second image. A dark region 36 represents an overlapping region, and a gray region 38 represents a non-overlapping region.

Figure 6:
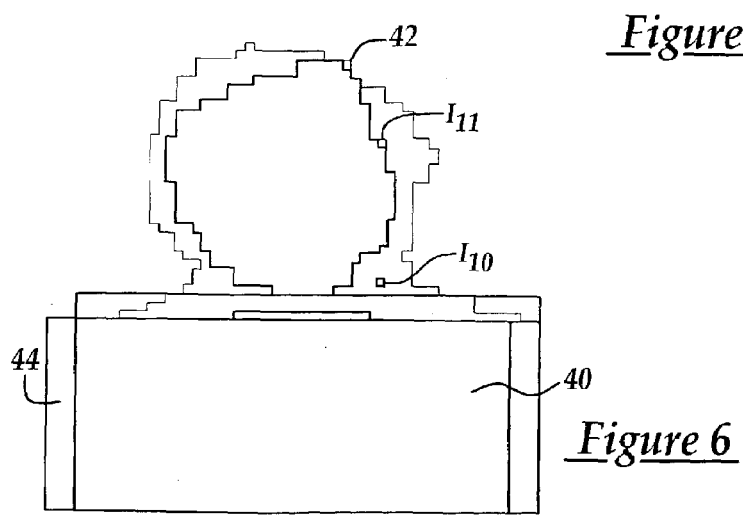
FIG. 6 illustrates an extent of an alignment shift between the two defect images.

As shown in FIG. 6, the aligning step preferably clearly defines a bulky region 40, the rectangle shape, and a defect region 42, the circular shape, however other elemental shapes may be defined. Overlapping regions between two defect images are counted, and are weighted differently for the bulky region 40 and for the defect region 42, wherein counting of the defect region is heavily weighed to give a satisfactory result of alignment. The bulky region 40 provides assistance for alignment or orientation by serving as a reference for measuring a relative distance between the defect round region 42 and the bulky rectangle region 40. For defects of the isolated-dot type, the alignment process is made simple without using a count of tessellated squares from the bulky region.

In operation, a rectangle square having a pre-defined dimension is aligned onto a defect image having tessellated movements, the tessellated defect image as shown in FIG. 6. Optionally, the tessellated defect image may be rotated.

In a preferred embodiment, as shown in FIG. 6, $I_{11}$ illustrates an overlapping circular region, and $I_{10}$ illustrates a non-overlapping circular region A shift region 44, as marked in FIG. 6, indicates the extent of alignment shift between the two defect images.

The tessellated image is aligned to determine a bulky region using iterations of an alignment formula. The alignment iterations are performed to meet an alignment criterion, wherein the alignment formula is defined as:

$$P\% = [N(I_1) - N(I_0)]/N(I_1) + N(I_0)], \text{ wherein } N(I_1) \text{ r}$$

the number of filled images disposed within the rectangle, and wherein $N(I_0)$ represents the number of blank images disposed within the rectangle.

Figure 8:
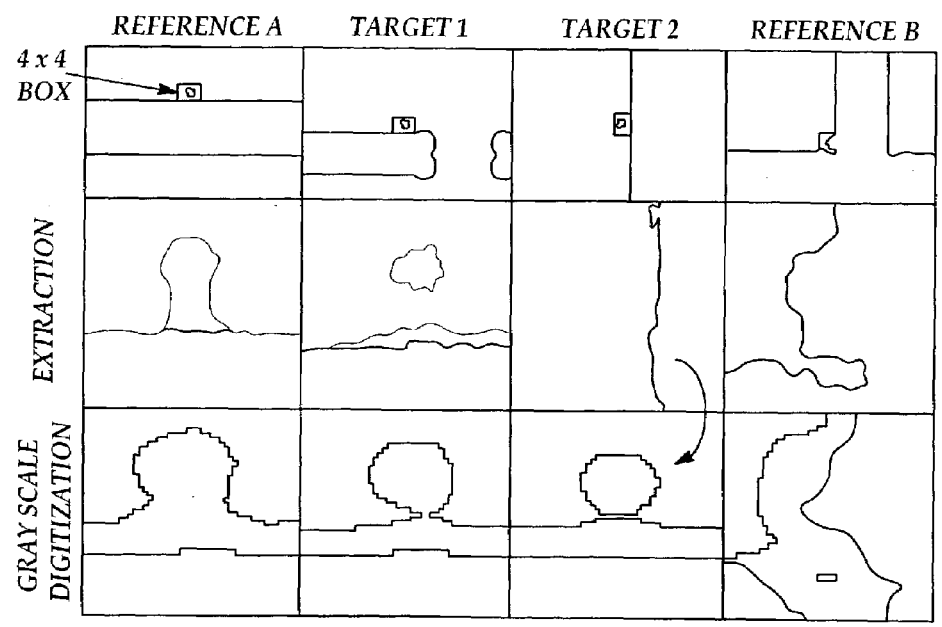
FIG. 8 illustrates an example of a satisfactory alignment between a reference image A relative to target images 1 and 2 and an unsatisfactory alignment between a reference image B relative to target images 1 and 2.

As shown in a preferred embodiment in FIG. 8, FIG. 8 illustrates an example of a satisfactory alignment between reference image A relative to target images 1 and 2. A failed reference image B in the alignment process is illustrated in reference image B.

After successful alignment of a target and a just-stored defect image, such as reference A, using position-intensity matrices, the images are compared using stringent criterion during the matching step, wherein a matching tolerance is programmable in advance.

The matching step is used to determine an extent of resemblance for any given two defect images aligned during the alignment process. The extent of resemblance between two defect images is described as an R-value, wherein the R value is calculated according to a formula:

$$R = [N(I_{11}) * P_{11} - N(I_{10}) * P_{10}] / [N(I_{11}) + N(I_{10})] N(I_{11})$$
$$\text{and } N(I_{10})$$

are numbers reflecting overlapping and non-overlapping regions, and wherein $P_{11}$ and $P_{10}$ are weighting factors associated with the overlapping and non-overlapping regions respectively. $P_{11}$ and $P_{10}$ may be weighed unequally, wherein each weight value is expressed as a function of position. A bulky region, such as the bulky region 40 as marked in FIG. 6, is not included in the R-value calculation. Instead, the matching step focuses on the defect region instead of the bulky region.

FIGS. 7a–d illustrates four defect images, wherein associated R-value calculations for each defect image shown in FIGS. 7a–d are tabulated in Table 1.

TABLE 1

|   | A    | B      | C      | D      |
|---|------|--------|--------|--------|
| A | 1.00 | +0.246 | +0.455 | −0.309 |
| B | —    | 1.00   | +0.225 | −0.638 |
| C | —    | —      | −1.00  | −0.223 |
| D | —    | —      | —      | 1.00   |

As shown in the preferred embodiment as illustrated in FIGS. 7a–d, $P_{11}$ and $P_{10}$ are arbitrarily set equal to 1, thus the R-value ranges between +1 and −1. An R-value of +1 represents an exact match, wherein an R-value of −1 strongly indicates a discrepancy.

Figures 7A, 7B, 7C, 7D:
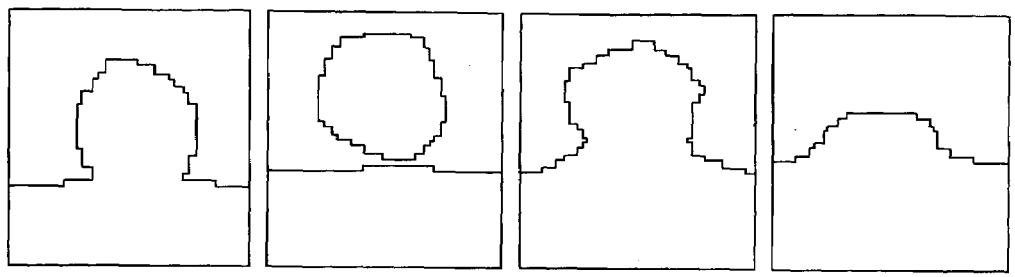
FIG. 7a illustrates a scanned defect image in accordance with the present invention.
FIG. 7b illustrates a scanned defect image in accordance with the present invention.
FIG. 7c illustrates a scanned defect image in accordance with the present invention.
FIG. 7d illustrates a scanned defect image in accordance with the present invention.

According to the calculated R-values shown in TABLE 1, image A, as shown in FIG. 7a, and image C, as shown in FIG. 7c show the highest similarity, wherein the associated R-value for the images A and C is +0.455. An eyeball examination of image A and image C supports the conclusion that images A and C have the highest similarity. Image B shows a similar resemblance to image A and C, however the R-value between image A and B of +0.246 indicates a higher resemblance between image A and B than between images B and C, wherein the R value between image B and C is +0.225. The difference in the similarity is The R value for images B and D is −0.638, indicating a poor similarity of the defect images. Accordingly, an eyeball examination of images B and D also support the conclusion that images B and D are not similar.

Figure 9:
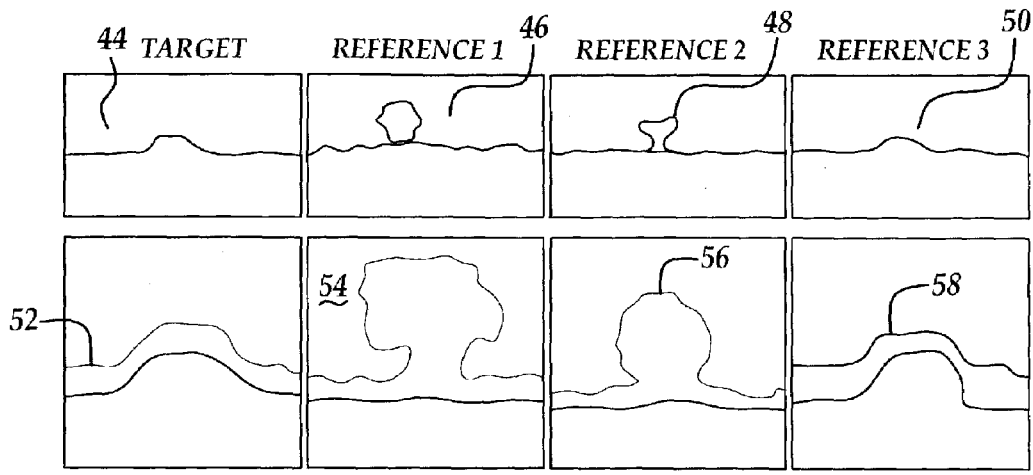
FIG. 9 illustrates a use of programmable tolerances within a matching step in accordance with the present invention.

FIG. 9 illustrates use of programmable tolerances within the matching step. Each image, target image 44, reference 1 image 46, reference 2 image 48, and reference 3 image 50 has an associated extracted and digitized image, 52, 54, 56, 58 respectively, disposed therein below. As shown, using overlapping of position-intensity matrices, images derived from reference 3 match best over images shown in references 1 and 2, respectively. Thus, a current target image defect will be classified in the same category as the image shown in reference 3.

The self-acting classification step is performed by comparing a target defect image with a just-stored defect image disposed within a just-stored defect image database. Preferably, the just-stored defect image database is formed by performing several iterations of steps within the PSL method in accordance with the present invention.

Figure 10:
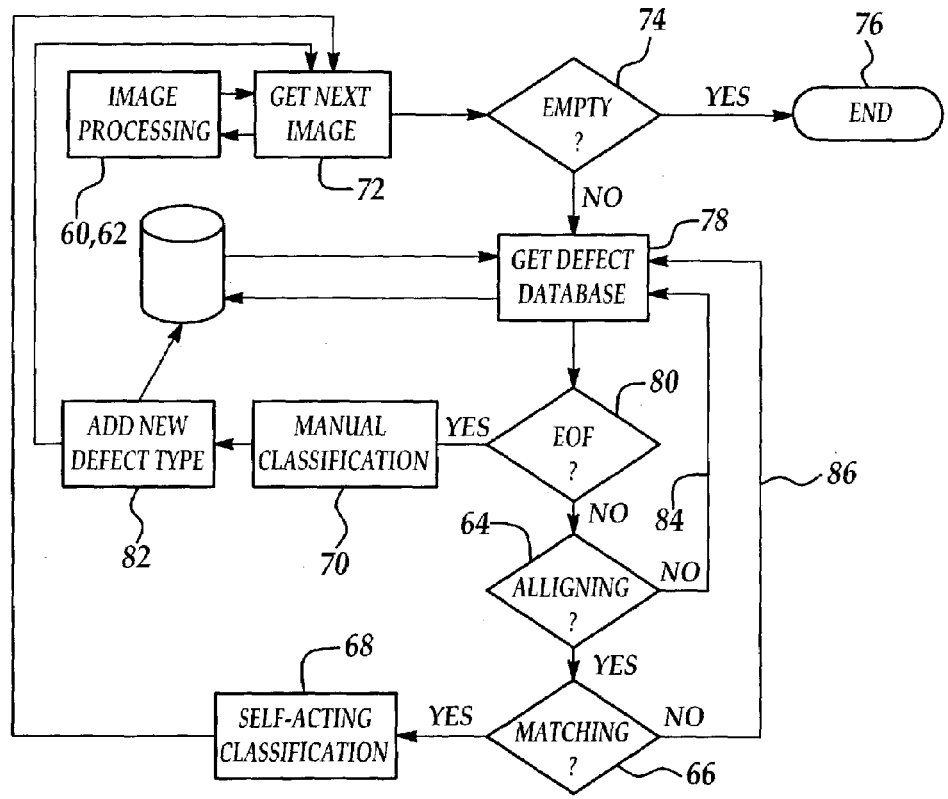
FIG. 10 illustrates a flowchart defining steps for a PSL method in accordance with the present invention.

As shown in an alternative embodiment in FIG. 10, a PSL method of the present invention provides the steps of:
extracting a scanned defect image from a scanned defect image file when the defect image file is not empty (step 60);
digitizing the scanned defect image (step 62);
determining if the scanned defect image aligns with a just-stored digitized defect image disposed within a just-stored defect image database when the just-stored digitized defect image database is not empty (step 64);
determining if the scanned defect image matches with a just-stored digitized defect image disposed within the just stored defect image database when the just-stored digitized defect image aligns with the scanned image (step 66); and
classifying the scanned defect image according to a classification method selected from the group of self-acting (step 68) and manual (step 70).

Additionally, the PSL method preferably provides the steps of:
accessing the scanned defect image file using an image processing system (step 72);
determining if the scanned defect image file is empty (step 74);
ending the PSL method when the scanned defect image file is empty (step 76).

Preferably, the PSL method provides the steps of:
accessing a just-stored digitized defect image database (step 78); and
determining if the just-stored digitized defect image database is empty (step 80);

The method also preferably provides the steps of:
manually classifying the scanned defect image when the just-stored digitized defect image database is empty (step 68); and
storing the manually classified scanned defect image as a just-stored digitized defect image within the just-stored digitized defect image database (step 82).

The method as shown in FIG. 10, further has the step of:
continuing to access the just-stored digitized defect image database until the scanned image aligns with the just-stored defect image disposed within the just-stored digitized defect image database (step 84).

The method as shown in FIG. 10 additionally preferably provides the step of:
continuing to access the just-stored digitized defect image database until the scanned image matches with the just-stored defect image disposed within the just-stored digitized defect image database (step 86).

From the foregoing, it should be appreciated that a wafer or mask defect PSL method is provided for improving inspection of wafers or masks within a wafer or mask fabrication facility. While a plurality of preferred exemplary embodiments have been presented in the foregoing detailed description, it should be understood that a vast number of variations exist and this preferred exemplary embodiment is merely an example, and it is not intended to limit the scope, applicability or configuration of the invention in any way. Rather, the foregoing detailed description provides those of ordinary skill in the art with a convenient guide for implementing a preferred embodiment of the invention and various changes can be made in the function and arrangements of the exemplary embodiment without departing from the spirit and scope of the appended claims.

What is claimed is:

1. A progressive self-learning (PSL) method for enhancing wafer or mask defect review and classification without reference to a pre-existing defect library to accelerate a defect review and classification process comprising the steps of:
performing image processing on a scanned defect image retrieved from a scanned defect image file to produce an extracted image comprising a defect map representation comprising two basic shapes including a bulky square region and a round region;
aligning the scanned defect image with a just-stored digitized defect image comprising a defect map representation comprising two basic shapes including a bulky square region and a round region;
determining if there is a match between the defect map representation produced from the scanned defect image and the defect map produced from the just-stored digitized defect image; and
classifying the scanned defect image according to a classification associated with the just-stored digitized defect image in the case of a match; or
adding the defect map representation produced from the scanned defect image to a newly formed database comprising the just-stored digitized defect image including manually classifying said 2-bit defect map in the case there is not a match.

2. The PSL method of claim 1 wherein the step of performing image processing on a scanned defect image from a scanned defect image file further comprises the steps of:
extracting a scanned defect image from a scanned defect image file; and
digitizing the scanned defect image using preselected digitizing parameters.

3. The PSL method of claim 2 wherein the step of extracting a scanned defect image comprises the, step of:
extracting a defect region having a dimension of n pixels by n pixels from a scanned image, wherein n is a pre-defined programmable number.

4. The PSL method of claim 2 wherein the step of digitizing comprises the steps of:
  converting the extracted image into a 2-bit defect map; and
  transforming the 2-bit defect map into a segmented image to produce said defect map representation.

5. The PSL method of claim 4 wherein the step of converting the extracted image into a 2-bit defect map comprises the step of:
  using a square tessellation method.

6. The PSL method of claim 5 wherein the step of transforming the 2bit defect map into a segmented image alignment step comprises the step of:
  transforming a sub-region of said 2-bit defect map into one or more polygons to produce a defect image shape.

7. The PSL method of claim 1 wherein the bulky square regions comprises a reference to align the bulky square region comprising the scanned defect image with the bulky square region comprising the just-stored digitized defect image.

8. The PSL method of claim 1 wherein the round region comprising the scanned defect image comprises a reference in the alignment step to locate a defect position.

9. The PSL method of claim 7 wherein overlapping regions of said bulky square regions are aligned in accordance with an alignment formula.

10. The PSL method of claim 1 wherein the step of determining if there is a match comprises the step of:
  calculating an R-value to determine the extent of resemblance between the 2-bit defect map representation comprising the scanned defect image and the 2-bit defect map representation comprising the just-stored defect image.

11. A progressive self-learning (PSL) method for enhancing water detect review and classification comprising the steps of
  a) accessing a scanned defect image file using an image processing system;
  b) determining if the scanned defect image file is empty;
  c) ending the PSL classification method when the scanned defect image file is empty;
  d) extracting a scanned defect image from the scanned defect image file when the defect image file is not empty;
  e) digitizing the scanned defect image;
  f) accessing a just-stored digitized defect image database;
  g) determining if the just-stored digitized defect image database is empty;
  h) manually classifying the scanned defect image when the just-stored digitized defect image database is empty;
  i) storing the manually classified scanned defect image as a new image defect type file within the just-stored digitized defect image database when the just-stored digitized defect image database is empty;
  j) determining if the scanned defect image aligns with a just-stored digitized defect image disposed within the just stored defect image database when the just-stored digitized defect image database is not empty;
  k) accessing the just-stored digitized defect image database when the scanned defect image does not align with a just stored image disposed within the just-stored digitized defect image database
  l) repeating steps f)–)k until the scanned defect image aligns with a just-stored defect image;
  m) determining if the scanned defect image matches with a just-stored digitized defect image disposed within the just stored defect image database when the just-stored digitized defect image aligns with the scanned image;
  n) accessing the just-stored digitized defect image database when the scanned defect image does not match with the just stored image disposed within the just-stored digitized defect image database;
  o) repeating steps f)–n) until the scanned defect image matches with a just-stored defect image; and
  p) performing a selfacting classification when the scanned image matches a just-stored defect image accessed from the just-stored digitized defect image database.

12. A progressive self-learning (PSL) method for enhancing wafer or mask defect review and classification comprising the steps of:
  performing image processing on a scanned defect image retrieved a scanned defect image file said image processing comprising;
    extracting the scanned defect image from a scanned defect image file;
    digitizing the scanned defect image using pre-selected digitizing parameters;
    transforming the 2-bit defect map into a segmented image according to a square tessellation method; and,
    converting the extracted image into a 2-bit defect map comprising two basic shapes including a bulky square region and a round region;
  aligning the scanned defect image with a just-stored digitized defect image;
  matching the scanned defect image with a just-stored digitized defect image; and
  classifying the scanned defect image according to a classification method selected from the group of self-acting and manual.

13. The method of claim 12 wherein the bulky square region comprises a reference to align the scanned defect image with a just-stored digitized defect image.

14. The method of claim 12 wherein the round region comprises a reference in the alignment step to locate a defect position.

15. The method of claim 12 wherein overlapping regions of the scanned defect image and the just-stored digitized defect image are aligned n accordance with an alignment formula.

16. The method of claim 12 wherein the step of matching the scanned detect image with the just-stored digitized defect image comprises the step of:
  calculating an R-value to determine the extent of resemblance between the scanned defect image and the just-stored defect image.

* * * * *